(12) United States Patent
Dowens et al.

(10) Patent No.: US 8,873,723 B1
(45) Date of Patent: Oct. 28, 2014

(54) IP TELEPHONE GEOGRAPHIC LOCATOR

(75) Inventors: Jac Dowens, Middletown, NJ (US); Paul J. Fellingham, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2316 days.

(21) Appl. No.: 11/209,860

(22) Filed: Aug. 24, 2005

(51) Int. Cl.
*H04M 15/00* (2006.01)

(52) U.S. Cl.
USPC .................. 379/142.1; 370/352; 379/126

(58) Field of Classification Search
USPC ............ 455/456.1–456.6; 701/213, 207, 216; 342/357.1, 357.06; 370/352
See application file for complete search history.

(56) References Cited

U.S. PATENT DOCUMENTS

| | | | | |
|---|---|---|---|---|
| 6,138,026 | A * | 10/2000 | Irvin ........................... | 455/456.3 |
| 6,155,707 | A * | 12/2000 | Brehier et al. ................ | 366/110 |
| 6,628,765 | B1 * | 9/2003 | Bangs et al. ............ | 379/112.01 |
| 6,665,611 | B1 | 12/2003 | Oran et al. | |
| 6,674,745 | B1 * | 1/2004 | Schuster et al. ............. | 370/352 |
| 6,757,544 | B2 | 6/2004 | Rangarajan et al. | |
| 6,771,742 | B2 | 8/2004 | McCalmont et al. | |
| 6,799,049 | B1 | 9/2004 | Zellner et al. | |
| 6,914,896 | B1 | 7/2005 | Tomalewicz | |
| 2002/0198632 | A1 * | 12/2002 | Breed et al. ....................... | 701/1 |
| 2003/0032436 | A1 * | 2/2003 | Mikuni ........................ | 455/457 |
| 2003/0050051 | A1 * | 3/2003 | Vilander ....................... | 455/414 |
| 2004/0140928 | A1 * | 7/2004 | Cleghorn ................. | 342/357.07 |
| 2005/0243802 | A1 * | 11/2005 | Barclay et al. ................ | 370/352 |
| 2006/0035647 | A1 * | 2/2006 | Eisner et al. ............... | 455/456.1 |
| 2006/0281437 | A1 * | 12/2006 | Cook .......................... | 455/404.2 |
| 2006/0293024 | A1 * | 12/2006 | Benco et al. ............... | 455/404.2 |

OTHER PUBLICATIONS

"Level 3 Provides E911 for VoIP," New Telephony, The Executive Report on IP Communications, Jan. 5, 2005 [online] [retrieved on Apr. 5, 2005] Retrieved from the Internet <URL: http://www.newtelephony.com/news/51h5101127.html>.

"GPS-WiFi Combo Could Make VoIP E9II Capable," Vonage, The Broadband Company, Oct. 24, 2004 [online] [retrieved on Dec. 20, 2004] Retrieved from the Internet ,URL: http://www.vonage-forum.com/article1289.html.

Ellen Muraskin, "8x8, Level 3 Deal Adds E911 to VoIP Service," eWeek Enterprise News & Reviews, Jun. 16, 2004 [online] [retrieved on Apr. 5, 2005] Retrieved from the Internet <URL: http://www.eweek.com/article2/0,1759,1612984,00.asp.

* cited by examiner

*Primary Examiner* — Ahmad Matar
*Assistant Examiner* — Jirapon Intavong

(57) ABSTRACT

An apparatus includes a Voice Over Internet Protocol (VOIP)-enabled device having a unique identifier and including a receiver. The receiver is configured to receive data associated with a current geographic position of the VOIP-enabled device. The VOIP-enabled device is configured to transmit a signal including the unique identifier and the data associated with the position to a network each time a call is initiated. In other embodiments, a method includes determining a current position of a VOIP-enabled device associated with a unique identifier, and transmitting a signal including data associated with the current position to an IP gateway either before or after a call is initiated from the VOIP-enabled device.

13 Claims, 2 Drawing Sheets

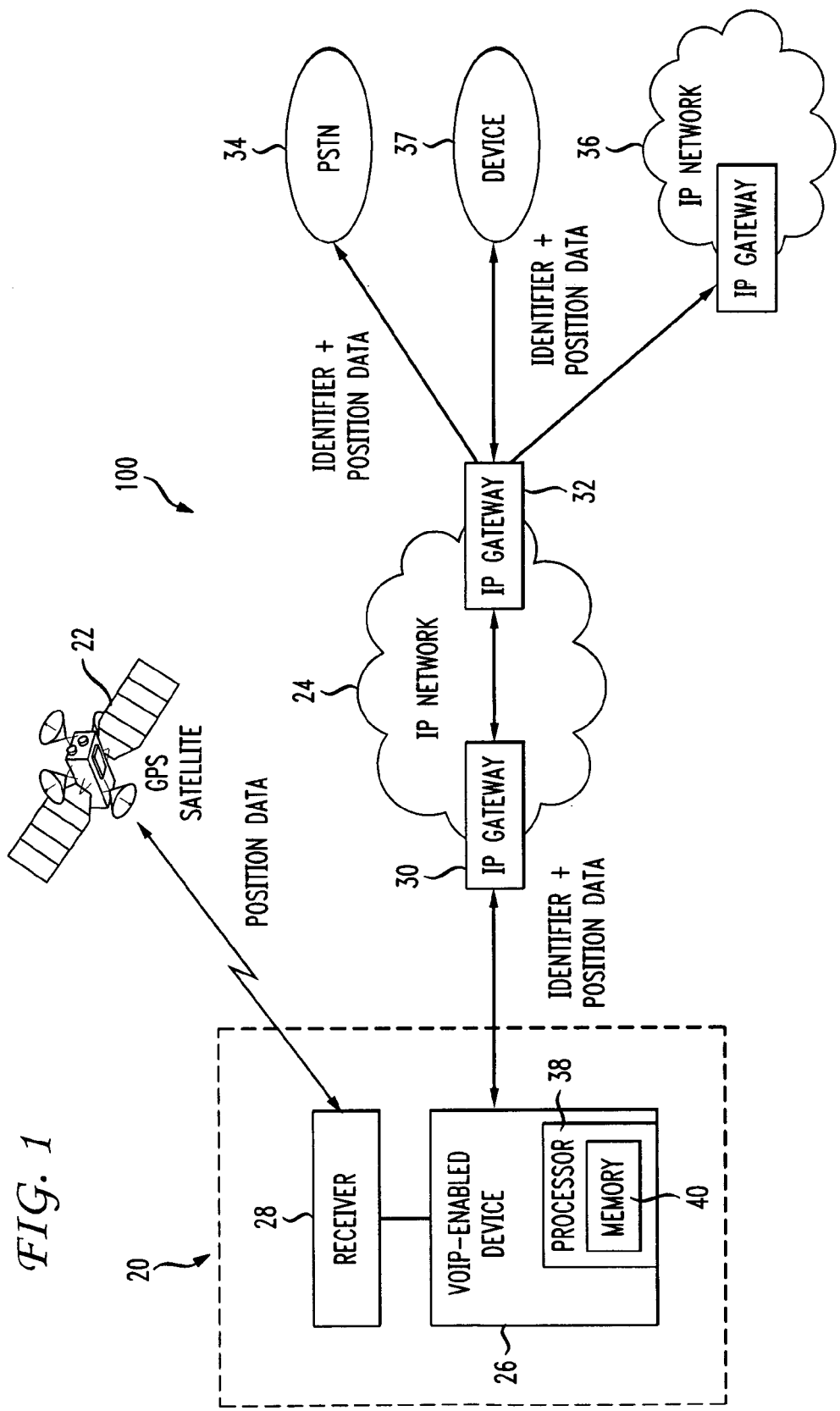

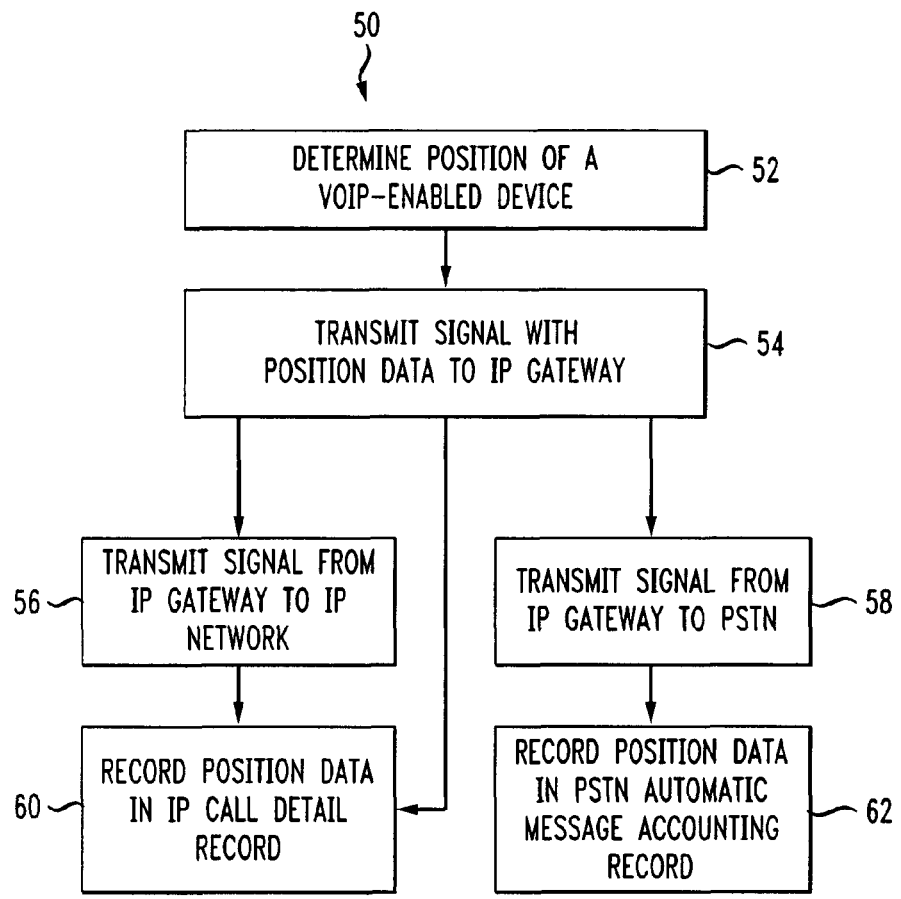

IP TELEPHONE GEOGRAPHIC LOCATOR

BACKGROUND

The invention relates generally to Voice Over Internet Protocol (VOIP) enabled devices, and more particularly, to providing the location of such devices over a telephone network.

It is often important to know the exact location of a telephone. For example, emergency medical services (EMS), communications assistance for law enforcement agencies (CALEA), Homeland Security, etc. rely heavily on the ability to pinpoint the location of an incoming call. Additionally, telephone companies are able to base their rates (i.e., long distance, local) on the location of the caller.

In standard telephony networks, a telephone is readily associated with a physical location through a database that the telephone company maintains. When a call is initiated from a standard telephone, the exact physical location of the telephone is known and information associated with the physical location can be transmitted over the network to, for example, law enforcement or other emergency agencies.

The location of a cellular telephone can be identified through the use of Global Positioning System (GPS) receivers embedded in cellular telephones. When a call is initiated, information associated with the location of the cellular telephone is transmitted over the cellular network.

The location of VOIP-enabled devices, however, is not readily identified. IP telephony customers can move their Telephone Adapters (TA) from one geographic location to another without changing the telephone number associated with the particular TA. When callers place calls from a geographic area other than their local calling area, there is no indication of the current geographic location of the TA.

Some attempts have been made to create an address database associated with VOIP-enabled devices of subscribers in a particular network, similar to a standard telephony network. Even with such a system, there is no way of determining the actual current physical location of the VOIP-enabled device at the time a call is initiated.

What is needed is a system and method for determining the location of a VOIP-enabled device each time a VOIP session is initiated from and/or directed to the VOIP-enabled device.

SUMMARY OF THE INVENTION

An apparatus includes a Voice Over Internet Protocol (VOIP)-enabled device having a unique identifier and including a receiver. The receiver is configured to receive data associated with a current geographic position of the VOIP-enabled device. The VOIP-enabled device is configured to transmit a signal including the unique identifier and the data associated with the geographic position to a network each time a call is initiated. In other embodiments, a method includes determining a current position of a VOIP-enabled device associated with a unique identifier, and transmitting a signal, including data associated with the current position, to a network either before or after a call is initiated from the VOIP-enabled device.

BRIEF DESCRIPTION OF THE DRAWINGS

FIG. 1 is a schematic illustration of a system according to an embodiment of the invention.

FIG. 2 is flowchart of a method according to an embodiment of the invention.

DETAILED DESCRIPTION

Embodiments of the disclosure relate to providing the location of a Voice Over Internet Protocol (VOIP)-enabled device over a telephone network. An apparatus according to an embodiment of the invention includes a VOIP-enabled device and a receiver coupled to the VOIP-enabled device. The receiver is configured to either receive data or generate data associated with a position of the VOIP-enabled device.

A VOIP-enabled device as described herein refers to any device configured to enable packet-switched telephone calls through a high-speed network, such as, for example, a telephone adapter or computer. The VOIP-enabled device is configured to transmit the data associated with the position of the VOIP-enabled device to a network, such as via an internet protocol (IP) gateway, using a Session Initiation Protocol (SIP) message. For example, in one embodiment, the VOIP-enabled device includes a wide area augmentation system (WAAS) digital global positioning system (GPS) receiver. The WAAS GPS receiver can be internally or externally coupled to the VOIP-enabled device. The WAAS GPS receiver receives data associated with latitude and longitude coordinates identifying the current position of the VOIP-enabled device from GPS satellites. When a call is originated from the VOIP-enabled device, a signal including the position information associated with the device is transmitted to the IP gateway associated with the VOIP-enabled device at that particular location.

When a call is received by the VOIP-enabled device, the VOIP-enabled device transmits a signal including position information associated with its location to the IP gateway associated with the party originating the call. The IP gateway and IP network associated with the IP gateway can interface with other IP networks or public switched telephone networks (PSTN). In one embodiment, the position coordinates of the VOIP-enabled device can be recorded in an IP Call Detail Record of the IP network and a PSTN Automatic Message Accounting Record. In alternative embodiments, the location of the VOIP-enabled device is detected using Wireless Fidelity® (Wi-Fi) location techniques, rather than or in addition to, GPS technologies.

Referring to FIG. 1, a schematic illustration of a system according to an embodiment of the invention is illustrated. The system 100 includes an apparatus 20 in communication with a GPS satellite 22 and an IP network 24. The apparatus 20 includes a VOIP-enabled device 26 including a receiver 28. The VOIP-enabled device 26 can be, for example, a computer, a telephone adapter, or other device configured to access a broadband service provider's network. For example, a telephone adapter (TA) can be coupled to a typical telephone used for telecommunications to convert the analog signal to a digital signal for transmittal of the signal through a broadband or other high speed network. The receiver 28 can be coupled externally or internally to the VOIP-enabled device using any known methods for coupling such devices. The receiver 28 can be, for example, a wide area augmentation system (WAAS) digital global positioning system (DGPS).

The IP network 24 can include one or more Internet or IP gateways 30 and 32 in communication with other networks, such as a public switched telephone network (PSTN) 34, and/or a second IP network 36. IP gateways are devices that translate the communications between, for example, the protocol of a local area network (LAN), such as the NetWare protocol, and the Transmission Control Protocol/Internet Protocol (TCP/IP) used on the Internet.

The VOIP-enabled device 26 includes a processor 38. The processor 38 can be, for example, a commercially available personal computer, or a less complex computing or processing device that is dedicated to performing one or more specific tasks. The processor 38, according to one or more embodiments of the invention, can be a commercially available microprocessor. Alternatively, the processor 38 can be an application-specific integrated circuit (ASIC) or a combination of ASICs, which are designed to achieve one or more specific functions, or enable one or more specific devices or applications. In yet another embodiment, the processor 38 can be an analog or digital circuit, or a combination of multiple circuits.

The processor 38 can include a memory component 40. The memory component 40 can include one or more types of memory. For example, the memory component 40 can include a read only memory (ROM) component and a random access memory (RAM) component. The memory component 40 can also include other types of memory that are suitable for storing data in a form retrievable by the processor 38. For example, electronically programmable read only memory (EPROM), erasable electronically programmable read only memory (EEPROM), flash memory, as well as other suitable forms of memory can be included within the memory component 40. The processor 38 can also include a variety of other components, such as for example, co-processors, graphic processors, etc., depending upon the desired functionality of the code.

The processor 38 is in communication with the memory component 40, and can store data in the memory component 40 or retrieve data previously stored in the memory component 40. The components of the processor 38 can communicate with devices external to the processor 38 by way of an input/output (I/O) component (not shown). According to one or more embodiments of the invention, the I/O component can include a variety of suitable communication interfaces. For example, the I/O component can include, for example, wired connections, such as standard serial ports, parallel ports, universal serial bus (USB) ports, local area network (LAN) ports, small computer system interface (SCSI) ports, and so forth. Additionally, the I/O component can include, for example, wireless connections, such as infrared ports, optical ports, Bluetooth® wireless ports, wireless LAN ports, or the like. The network to which the processor 38 is connected can be physically implemented on a wireless or wired network, on leased or dedicated lines, including a virtual private network (VPN).

The VOIP-enabled device 26 (hereinafter referred to as TA 26) is configured with a unique identifier, such as a serial number or an IP address. The receiver 28 coupled to the TA 26 is configured to receive data associated with a current geographic location or position of the TA 26 from a locator source using a digital global position system (DGPS), a WiFi configured system for position detection, or other suitable location detection system. The data associated with the geographic position can include, for example, latitude and longitude coordinates for the location of the TA 26. The locator source can be, for example, a GPS satellite as shown in FIG. 1.

The TA 26 is further configured to transmit a signal either before or after a call is initiated to an IP gateway, such as IP gateway 30 of the IP network 24 associated with the TA 26. The signal can include the unique identifier and the data associated with the geographic location of the TA 26. In addition, when a call is received at the TA 26, the TA 26 can send a signal to the IP gateway including the unique identifier and the data associated with the geographic location of the TA 26.

Regardless of the timing of the transmission, the signal can be sent via a session initialization protocol (SIP) message. The SIP message informs the IP network of the geographic location of the VOIP-enabled device during a call, whether the call is initiated by the VOIP-enabled device or whether the VOIP-enabled device received the call. Thus, if a call is placed or received by a VOIP-enabled device as described herein, the geographic location of that device can be identified.

SIP is a protocol that enables multi-user interactive sessions regardless of media content. There are many types of SIP-based services, such as local and long distance telephony, instant messaging, voice messaging, push-to-talk and media conferencing. SIP defines how the participant's end devices can create, modify and/or terminate a connection whether the content is voice, video, data or Web-based. An example of a SIP message including data associated with the geographic location of a VOIP-enabled device follows.

An example of a generic SIP message:
<sip:To/From_number@ip_address;longitude;latitude>
A specific example of a SIP message:
Call to or from 555-123-4567 with longitude=40 deg/14 min/10 sec and latitude=70 deg/08 min/20 sec
<sip:5551234567@160.14.151.76;401410;700820>

In some embodiments, both the VOIP-enabled device making the call and the VOIP-enabled device receiving the call are configured to receive and send position data. In this situation, both of the VOIP-enabled devices can receive and transmit data associated with its respective geographic location. Thus, each of the VOIP-enabled devices would transmit a SIP message including its geographic position data to the IP gateway associated with that respective device. Examples of SIP messages that can be sent from each of the VOIP-enabled devices follows.

Call to 555-765-4321 with longitude=45 deg/32 min/25 sec and latitude=74 deg/22 min/15 sec
<sip:5557654321@152.10.140.86;453225;742215>
Call from 555-123-4567 with longitude=40 deg/14 min/10 sec and latitude=70 deg/08 min/20 sec
<sip:5551234567@160.14.151.76;401410;700820>

The IP network 24 can record the position data associated with the TA 26 within an IP call detail record and also transmit the position data to other interconnected devices and/or networks, such as PSTN 34, second IP network 36 and device 37. Device 37 can be, for example a wireless device. For example, a call may originate at TA 26 and terminate at another device within another network, such as PSTN 34 or IP network 36. The IP network 24 associated with TA 26 transmits the position data to the network where the call terminates. The PSTN 34 can record the data associated with the position of the TA 26 in an automatic message accounting record. Likewise, the IP network 36 can record the data in an IP call detail record. The stored or recorded data can be subsequently accessed by, for example, government agencies, such as the Federal Communications Commission (FCC) and/or Homeland Security, investigating fraud, or other illegal activities. Alternatively, the recorded data can be transmitted to a network or device associated with such entities as described above. The data record can also be useful to billing systems to determine the rate center where the VOIP-enabled device is located based on the latitude and longitude information.

FIG. 2 is a flowchart illustrating a method according to an embodiment of the invention. A method 50 includes determining a current geographic position of a VOIP-enabled device having a unique identifier, at step 52. Position data can include, for example latitude and longitude coordinates of the VOIP-enabled device. At step 54, a signal including the data associated with the current geographic position of the VOIP-enabled device is transmitted to an IP gateway of an IP network associated with the VOIP-enabled device. The signal also includes the unique identifier associated with the VOIP-enabled device and can be transmitted in the form of a SIP message as described above, or in some other suitable format. The signal can be sent before or after the initiation of a call by the VOIP-enabled device. The signal can also be sent upon receipt of a call by the VOIP-enabled device.

The IP network can then transmit the signal to other networks such as another IP network at step 56, or a PSTN at step 58. The IP network, as well as any additional IP networks that received the signal, can record the position data in an IP call detail record at step 60. Likewise, the PSTN can record the position data in an automatic message accounting record at step 62.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in art that various changes in form and details may be made therein without departing from the spirit and scope of the invention.

For example, although the VOIP-enabled device is primarily described with reference to a telephone adapter, in alternative embodiments, the VOIP-enabled device can be any device configured to enable communication with a broadband service provider.

Although not specifically described, the receiver coupled to the VOIP-enabled device can be any type of global positioning system compatible device configured to communicate and receive information from a GPS satellite.

What is claimed is:

1. An apparatus, comprising:
a telephone adapter having a unique identifier, the telephone adapter comprising a processor, wherein the unique identifier is an internet protocol address, wherein the telephone adapter is for coupling to an analog telephone and for converting an analog signal to a digital signal; and
a receiver for receiving data associated with a current geographic position of the telephone adapter, wherein the data associated with the current geographic position is received from a global positioning system, wherein the processor commands a signal to be transmitted in a session initiation protocol message that includes the current geographic position comprising a latitude and a longitude associated with the current geographic position of the telephone adapter from the telephone adapter to a gateway of a network each time a call is initiated, wherein the signal includes the unique identifier, irrespective of whether the call is a placed call or a received call, wherein the geographic position of the telephone adapter is recorded at an internet protocol network in an internet protocol call detail record and at a terminating public switched telephone network in an automatic message accounting record, wherein the internet protocol call detail record and the automatic message accounting record are used by a billing system to determine a rate center where the telephone adapter is located.

2. The apparatus of claim 1, wherein the receiver is a wide area augmentation system digital global positioning system.

3. The apparatus of claim 1, wherein the gateway comprises an internet protocol gateway of the network.

4. A method, comprising:
determining, via a receiver, a current position of a telephone adapter having a processor, the telephone adapter being associated with a unique identifier, wherein the telephone adapter is for coupling to an analog telephone and for converting an analog signal to a digital signal, wherein the determining the current position includes determining a latitude and a longitude of the telephone adapter using the receiver, wherein the receiver comprises a global positioning system receiver; and
transmitting via the processor a signal in a session initiation protocol message that includes the current position of the telephone adapter from the telephone adapter to a gateway of a network each time a call is initiated via the telephone adapter, wherein the signal includes the unique identifier, irrespective of whether the call is a placed call or a received call, wherein the current position of the telephone adapter is recorded at an internet protocol network in an internet protocol call detail record and at a terminating public switched telephone network in an automatic message accounting record, wherein the internet protocol call detail record and the automatic message accounting record are used by a billing system to determine a rate center where the telephone adapter is located, wherein the transmitting the signal includes transmitting a latitude and a longitude associated with the current position of the telephone adapter.

5. The method of claim 4, further comprising:
transmitting the signal from the network to an internet protocol network.

6. The method of claim 4, wherein the gateway comprises an internet protocol gateway of the network.

7. A method, comprising:
determining, via a receiver, a current position of a telephone adapter comprising a processor, the telephone adapter being associated with a unique identifier, wherein the telephone adapter is for coupling to an analog telephone and for converting an analog signal to a digital signal, wherein the determining the current position includes determining a latitude and a longitude of the telephone adapter using the receiver, wherein the receiver comprises a global positioning system receiver; and
transmitting via the processor a signal in a session initiation protocol message that includes the current position of the telephone adapter from the telephone adapter to a gateway of a network after a call is received by the telephone adapter, wherein the current position of the telephone adapter is recorded at an internet protocol network in an internet protocol call detail record and at a terminating public switched telephone network in an automatic message accounting record, wherein the internet protocol call detail record and the automatic message accounting record are used by a billing system to determine a rate center where the telephone adapter is located, wherein the transmitting the signal includes transmitting a latitude and a longitude associated with the current position of the telephone adapter.

8. A non-transitory processor-readable medium storing instructions to cause an apparatus comprising a receiver and a telephone adapter to perform operations, the operations comprising:

determining via the receiver a current position of the telephone adapter having a processor, the telephone adapter being associated with a unique identifier, wherein the telephone adapter is for coupling to an analog telephone and for converting an analog signal to a digital signal, wherein the determining the current position includes determining a latitude and a longitude of the telephone adapter using the receiver, wherein the receiver comprises a global positioning system receiver; and transmitting via the processor a signal in a session initiation protocol message that includes the current position of the telephone adapter from the telephone adapter to a gateway of a network each time a call is initiated via the telephone adapter, wherein the signal includes the unique identifier, irrespective of whether the call is a placed call or a received call, wherein the current position of the telephone adapter is recorded at an internet protocol network in an internet protocol call detail record and at a terminating public switched telephone network in an automatic message accounting record, wherein the internet protocol call detail record and the automatic message accounting record are used by a billing system to determine a rate center where the telephone adapter is located, wherein the transmitting the signal includes transmitting a latitude and a longitude associated with the current position of the telephone adapter.

9. The non-transitory processor-readable medium of claim 8, the code further comprising code to:

transmit the signal from the gateway to an internet protocol network.

10. A method, comprising:

receiving a signal in a session initiation protocol message that includes geographic position data associated with a telephone adapter from the telephone adapter at an internet protocol gateway including a unique identifier associated with the telephone adapter each time a call is initiated via the telephone adapter, irrespective of whether the call is a placed call or a received call, wherein the telephone adapter is for coupling to an analog telephone and for converting an analog signal to a digital signal, wherein the geographic position data comprises a latitude and a longitude associated with the current position of the telephone adapter and is recorded at an internet protocol network in an internet protocol call detail record and at a terminating public switched telephone network in an automatic message accounting record, wherein the internet protocol call detail record and the automatic message accounting record are used by a billing system to determine a rate center where the telephone adapter is located, wherein the geographic position data is from a global positioning system; and determining, via the internet protocol gateway, a geographic position of the telephone adapter based on the signal.

11. The method of claim 10, further comprising:

transmitting the signal from the internet protocol gateway to a device separate from the internet protocol gateway.

12. The method of claim 11, wherein the device is a network.

13. The method of claim 11, wherein the device is a wireless device.

* * * * *